United States Patent
Yamamoto et al.

(10) Patent No.: US 6,833,148 B1
(45) Date of Patent: Dec. 21, 2004

(54) GREEN VEGETABLE PUREES, PROCESS FOR PRODUCING THE SAME AND FOODS CONTAINING THE PUREES

(75) Inventors: Keiko Yamamoto, Osaka (JP); Makoto Suwa, Minoo (JP)

(73) Assignee: Sunstar Inc., Osaka (JP)

( * ) Notice: Subject to any disclaimer, the term of this patent is extended or adjusted under 35 U.S.C. 154(b) by 0 days.

(21) Appl. No.: 09/807,731

(22) PCT Filed: Oct. 15, 1999

(86) PCT No.: PCT/JP99/05717

§ 371 (c)(1),
(2), (4) Date: Apr. 16, 2001

(87) PCT Pub. No.: WO00/22941

PCT Pub. Date: Apr. 27, 2000

(30) Foreign Application Priority Data

Oct. 16, 1998 (JP) .......................................... 10-295767

(51) Int. Cl.$^7$ .............................................. A23L 1/212
(52) U.S. Cl. ........................ 426/321; 426/518; 426/599; 426/615
(58) Field of Search ................................ 426/615, 321, 426/518, 599

(56) References Cited

U.S. PATENT DOCUMENTS

| 5,750,181 A | * | 5/1998 | Greff | 426/615 |
| 5,858,446 A | * | 1/1999 | Lewis et al. | 426/615 |

FOREIGN PATENT DOCUMENTS

| EP | 758529 A | 4/1997 |
| JP | 60-58055 A | 4/1985 |
| JP | 1-206965 A | 8/1989 |
| JP | 2-273140 A | 11/1990 |
| JP | 5-328934 A | 12/1993 |
| JP | 6-181684 A | 7/1994 |
| JP | 8-131065 A | 5/1996 |
| JP | 8-256728 A | 10/1996 |
| JP | 9-23840 | 1/1997 |
| JP | 9-23859 | 1/1997 |
| JP | 9-65851 A | 3/1997 |
| JP | 9-103262 A | 4/1997 |
| JP | 9-154481 A | 6/1997 |
| WO | WO 92/22213 A | 12/1992 |

OTHER PUBLICATIONS

Rombauer et al. Joy of Cooking, 1975, The Bobbs–Merrill co., Inc. N. Y., p. 43.*

* cited by examiner

*Primary Examiner*—Helen Pratt
(74) *Attorney, Agent, or Firm*—Knobbe, Martens, Olson & Bear LLP

(57) ABSTRACT

The green vegetable puree production process according to the present invention, which contains a grinding step and an acid addition step and does not include a heating step, produces an unheated green vegetable puree having no catalase activity, containing an acid or acids and having a pH of 2.7 to 4.1. The puree sufficiently maintains the original flavor and taste and freshness of vegetables and is suitable for use in the preparation of foods, especially for vegetable juices.

19 Claims, No Drawings

GREEN VEGETABLE PUREES, PROCESS FOR PRODUCING THE SAME AND FOODS CONTAINING THE PUREES

This is the U.S. national phase under 35 U.S.C. §317 of International application PCT/JP99/05717, filed Oct. 15, 1999.

TECHNICAL FIELD

The present invention relates to vegetable purees. More specifically, the present invention relates to green vegetable purees maintaining the original flavor and taste and freshness of vegetables, a process for producing the purees and foods containing the purees.

BACKGROUND ART

In recent years, it has been pointed out that vegetable intake is insufficient due to the popularization of instant foods and eating-out. Insufficient vegetable intake is said to be one of the causes of life-style related diseases such as hypertension.

In such situation, beverages such as vegetable juices are one of the means for easily taking vegetables.

The vegetable juice includes products mainly containing freshly squeezed vegetable juice prepared by squeezing vegetables and removing pulp components, and products mainly containing vegetable puree prepared by grinding whole vegetables. The squeezed vegetable juice, if used, necessitates the step of removing pulp components after squeezing the vegetables, resulting in low production efficiency. Furthermore, vegetable juice mainly containing such squeezed vegetable juice has the defect of failing to utilize effective ingredients and nutrients such as insoluble dietary fibers contained in the pulp components. By contrast, vegetable puree is free of such problems. When a puree is incorporated into a vegetable juice, the resulting juice has high nutrition and also has texture as if the vegetables per se were ingested.

Conventionally, vegetable purees are generally prepared by the process comprising the steps of washing and cutting vegetables, followed by blanching (heating in boiling water for a few minutes to inactivate enzymes and achieve pasteurization). However, the purees prepared by the above conventional method have the following defects:
1) the original flavor and taste, freshness and nutritional elements of vegetables are lost upon heating in the blanching process;
2) since the blanching for enzyme inactivation and pasteurization and the grinding are carried out consecutively (not concurrently), it takes time and trouble, thus impairing flavor and taste.

However, if raw vegetables are ground without blanching in order to preserve freshness, it is impossible to achieve bacteriostasis or inactivate enzymes, resulting in remarkable changes in flavor and taste and color tone. Such puree is unsuitable as raw material for the preparation of vegetable juices.

On the other hand, a method proposed for long-term preservation of purees comprises freezing raw vegetables after grinding. The method, however, has problems such as yellowing discoloration caused by enzymes upon thawing, and growth of microorganisms. To solve these problems, Japanese Unexamined Patent Publication No. 154481/1997 proposes ground vegetables prepared by heating raw ground vegetables having a pH of 3.3 to 4.5 at 60° C. to 80° C. for 30 seconds to 2 minutes so as to preserve the original flavor and texture of the raw ground vegetables at low temperatures or normal temperatures (−10° C. to 40° C.). However, since a heat treatment is carried out in the method, flavor and taste and freshness of the resulting puree are impaired.

DISCLOSURE OF INVENTION

An object of the invention is to provide a vegetable puree which is free of the above defects.

The present inventors carried out intensive research and found that when green vegetables are ground in the presence of an acid, or when an acid is added immediately after grinding, inactivation of enzymes and bacteriostasis are sufficiently achieved without carrying out the additional step of heating and the resulting raw puree satisfactorily retains the original flavor and taste, freshness and nutritional elements of vegetables. The present inventors further found that when the raw puree thus obtained is stored frozen, the puree substantially maintains the original flavor and taste and freshness of vegetables even after thawing. The present inventors further found that the unheated green vegetable puree as incorporated into a vegetable juice also maintains flavor and taste. The present invention has been accomplished based on these findings.

The present invention includes the following inventions listed in items 1–15:

Item 1. An unheated green vegetable puree which does not have catalase activity and contains an acid or acids and has a pH of 2.7–4.1.

Item 2. The vegetable puree according to item 1, which is obtainable by a process comprising a grinding step and an acid addition step.

Item 3. The vegetable puree according to item 2, which is obtainable by the process wherein the acid addition is performed before or during the grinding step.

Item 4. The vegetable puree according to item 2, which is obtainable by the process wherein the acid addition is performed immediately after the grinding step.

Item 5. The vegetable puree according to item 1, which is obtainable by freezing a puree prepared by a process comprising a grinding step and an acid addition step.

Item 6. The vegetable puree according to Item 5, which is obtainable by the process wherein the acid addition is performed before or during the grinding step.

Item 7. The vegetable puree according to item 5, which is obtainable by the process wherein the acid addition is performed immediately after the grinding step.

Item 8. A food containing the vegetable puree of item 1.

Item 9. The food according to item 8, which is a vegetable juice.

Item 10. A process for preparing an unheated green vegetable puree, which comprises a grinding step and an acid addition step.

Item 11. The process according to item 10, wherein the acid addition is performed before or during the grinding step.

Item 12. The process according to item 10, wherein the acid addition is performed immediately after or during the grinding step.

Item 13. The process according to item 10, which further comprises freezing the ground puree.

Item 14. Use of the vegetable puree of item 1 for preparing a food.

Item 15. The use according to item 14, wherein the food is a vegetable juice.

The vegetable puree according to the present invention is an unheated green vegetable puree which does not have catalase activity and contains an acid or acids and has a pH of 2.7–4.1. The puree of the present invention maintains high levels of flavor and taste and freshness which are similar to those of raw vegetables. These can be confirmed by carrying out sensory evaluation tests, for example, visual inspection for signs of any browning.

The vegetable puree according to the present invention is a puree of green vegetable(s). Examples of green vegetables include cabbage, broccoli, celery, lettuce (*Lactuca sativa L.*), turnip leaves, cauliflower, komatsuna (*Brassica rapa L.*), Japanese radish (*Raphanus sativus L.*) leaves, qing-geng-cai, Chinese cabbage, spinach, Brussels sprouts, kale and the like. Particularly preferred are cabbage, broccoli, celery and lettuce. Most preferable is cabbage. The puree of the present invention may be a puree of one kind of green vegetable or two or more kinds of green vegetables.

When inactivation of enzymes is insufficient, flavor and taste and color tone will change. Therefore, inactivation of enzymes is essential in the puree of the present invention. By confirming inactivation of catalase, it can be assumed that the other enzymes relating to impairment of flavor and taste and color tone have also been inactivated. The inactivation of catalase can be confirmed, for example, by adding aqueous hydrogen peroxide solution to the puree and observing that no bubbling occurs.

Since the vegetable puree of the present invention is ingested as food, the viable cell count should be suppressed within the range required of food. "The viable cell count should be suppressed within the range required of food" means that the total viable cell count in the puree may be in the range usually acceptable to foods. For example, the viable cell count may be within the range that satisfies the following conditions: the puree has a total plate count of 3,000,000 cfu/g or less and is *Escherlchia coli* negative. Such viable cell count meets the standard for microorganisms in frozen foods to be eaten after heating, as prescribed in the Ministry of Health and Welfare Announcement No. 370.

The puree of the present invention contains an acid or acids and has a pH of about 4.1 or less, preferably 4 or less, more preferably 3.7 or less. For maintaining the flavor and taste of vegetables, the lower limit is pH about 2.7, preferably pH about 3.

The puree of the present invention is an unheated puree and therefore has not lost texture, flavor, taste and freshness of raw vegetables, or vitamin C and like nutritional elements which are easily affected by heat.

In the present invention, "unheated" means that the production process does not comprise heat treatment. For example, unlike the conventional blanching step, the process does not comprise the step of heating for several minutes for inactivation of enzymes and/or pasteurization.

The puree of the present invention can be prepared, for example, by a method comprising a grinding step and an acid addition step and not including any heat treatment. The method is described below more specifically.

One or more vegetables are usually used after removing damaged or brown portions. Core removal and stem removal are not always necessary. The vegetable(s) are washed and cut into pieces which can be put into a machine.

The cut pieces of vegetable(s) were placed in a crusher for processing vegetables into a puree, for example, COMITROL or Masscolloider. The grinding may be carried out with a single vegetable or two or more kinds of vegetable.

According to the production process of the present invention, vegetables are ground in the presence of an acid or acids, which may be added, for example, at the time of washing the vegetables, or during the time between the cutting step and the grinding step, or at the time of grinding. With a view to production efficiency and freshness of the puree obtained, it is preferable to add the acid at the time of grinding. In order to inactivate enzymes and achieve bacteriostasis, vegetables are ground in the presence of an acid. As an alternative, the acid may be added immediately after grinding (usually within about 5 minutes). Since the acid added immediately after grinding readily disperses evenly, the puree is unlikely to have non-uniform acid concentration, thus being preferred.

The acid(s) may be any of organic acids and inorganic acids, but organic acids are preferred.

Examples of organic acids include citric acid, acetic acid, succinic acid, malic acid and ascorbic acid. In view of flavor and taste, citric acid is preferred.

Acids that can be used further include juices of fruits containing an acid or acids such as citric acid. Examples of such fruits are lemon, acerola, kiwi, lime, yuzu (Citrus junos Tanaka), kabosu (Citrus sphaerocarpa Tanaka), and sudachi (Citrus sudachi). Particularly preferred are lemon and lime. The fruit juice may be used as it is or in the form of a concentrate.

The acid(s) may be used in any amount, only if the desired effects of the present invention are achieved. The acid(s) are preferably used in an amount to provide an acidity, calculated as citric acid, of 0.01 to about 5 wt. %, more preferably about 0.4 to about 1.5 wt. %, particularly preferably about 0.6 to about 1.3 wt. %, further more preferably about 0.8 to about 1.1 wt. %, based on the total weight of the vegetable puree obtained.

The amount of fruit juice used as an acid may be suitably selected according to the kind of fruit juice and with reference to the aforementioned acidity calculated as citric acid. For example, a lemon juice concentrate having an acidity (calculated as citric acid) of 24 wt. % may be added in an amount of about 0.04 to about 20 wt. parts per 100 wt. parts of the vegetable puree.

Grinding is usually carried out at normal temperatures. In some crushers, the temperature may slightly rise during grinding. However, if the temperature is not over about 40° C., no problems will arise and it is within the "unheated" range according to the present invention.

The process for preparing the puree of the present invention may comprise adding a salt or salts. Adding a salt or salts is advantageous for inactivation of enzymes and bacteriostasis.

Any salts may be used if they do not adversely affect the effects of the present invention. Preferred is sodium chloride, calcium gluconate, sodium gluconate or potassium gluconate.

The salts may be used in any amounts, only if the desired effects of the present invention are achieved. Each salt is preferably used in an amount of about 0.01 wt. parts or more, particularly 0.2 wt. parts or more, per 100 wt. parts of the vegetables to be ground. Although there is no upper limit, the salts are usually used in an amount of about 2 wt. parts per 100 wt. parts of the vegetables to be ground.

The acid(s) (and salt(s)), if added at the time of grinding, is preferably formed into an aqueous solution, fruit juice or like liquid and poured into a crusher so as to evenly spread. The acid(s) (and salt(s)) may be added once or in two or more divided portions. Similarly, the acid(s) (and salt(s)), if added after grinding, is preferably used in the form of a liquid. As an alternative, vegetables may be washed with water containing the acid(s) (and salt(s)), or immersed in an aqueous solution of the acid(s) (and salt(s)) during the time between the cutting step and the grinding step. The acid(s) and salt(s) may be added at the same time or separately.

If the cells are disrupted too much in the grinding step, excess intracellular enzymes will be released, so that flavor and taste and quality may be impaired before inactivation of the enzymes by acid treatment. For this reason, in the case of using a COMITROL for grinding, the head usually has 200 or less blades, preferably 100 or less blades, further preferably 80 or less blades, although there is no specific limitation on the head, only if the desired effects are achieved. Although there is no specific lower limit, the lower limit could be about 50 blades.

The puree may have any grain size only if the desired effects of the present invention are achieved. For the above reasons and in the light of texture, the puree preferably has a grain size such that 25 wt. % or more of the puree is retained on 12 to 30 mesh sieves.

The puree thus obtained may be subjected to a freezing treatment. The puree can be frozen by any of the conventional methods for freezing foods, as prescribed in the Food Sanitation Law, for example, by packing the puree in a 18-liter can and storing the canned puree in a freezing room at −20° C. or below.

The frozen puree may be refrigerated so as to maintain the puree at a temperature not higher than −20° C. and thawed before use by the conventional method. The thawing is preferably carried out while maintaining the puree at a temperature of not higher than 10° C., for example, by immersing the puree in about 10–20° C. water for about 10 to about 15 hours, or by allowing the puree to stand at room temperature overnight for partial thawing, followed by forming the puree into a sherbet which is used as it is to prepare a food.

When the puree is preserved in a frozen state, the viable cell count decreases.

The puree of the present invention includes unfrozen raw purees, frozen purees and thawed purees. The raw purees are preferably used as they are to prepare beverages or like foods. For preservation, the purees are preferably stored in a frozen state.

The aforementioned production processes are exemplary processes for preparing the vegetable puree of the invention. The puree of the present invention includes any unheated green vegetable purees having no catalase activity and containing an acid or acids and may be prepared by the other production processes.

The vegetable puree of the present invention may be used alone or in combination with other food materials for preparation of various foods. The puree is especially suitable for use in foods where high freshness of vegetables is required.

Thus, foods containing the vegetable puree of the invention are included in the scope of the present invention.

Examples of foods include beverages such as vegetable juices; seasonings such as dressings, various sauses and like foods. Especially preferred are vegetable juices or like beverages containing the vegetable puree of the present invention.

The food of the present invention can be prepared by the conventional method, using the vegetable puree of the present invention together with other food materials and/or additives usually used in such form of food. Examples of other additives and food materials include sweeteners, colorants, antloxldants, vitamins, flavoring agents and thickening agents. Further, vegetable and/or fruit purees other than the green vegetable puree of the invention, and squeezed juices may be added, if necessary.

In the preparation of foods, the pH may be adjusted by the conventional method.

The vegetable puree content of the food containing the vegetable puree of the invention may be suitably selected from a wide range according to the kind of food, etc. and may be, for example, about 1 to about 100 wt. %, more preferably about 5 to about 95 wt. %.

The content of the vegetable puree of the present invention in vegetable puree-containing beverages, for example, cabbage puree content is preferably about 5 wt. % or more, more preferably 8 wt. % or more with the view of maintaining the original freshness and nutritional elements of vegetables after heat pasteurization as prescribed in the Food Sanitation Law. The upper limit of the content is usually about 40 wt. %, preferably about 25 wt. %, in view of easiness to drink. The contents of other vegetable purees may be suitably selected with reference to the cabbage puree content.

In the case of preparing vegetable juices, the juices when packed in cans may be quickly heated for pasteurization (for example, heating for several seconds at about 90° C.), as prescribed in the Food Sanitation Law, Section D "Standards for foods". Item "Soft Drinks".

The conventional methods for preparing purees comprise heating the puree for pasteurization in a blanching treatment. Therefore, when the puree is used for preparing a vegetable juice, the puree is subjected to heat treatment at least twice, including the heat treatment for pasteurization at the time of packing the juice as prescribed in the Food Sanitation Law. By contrast, the vegetable puree prepared by the above process of the present invention is not subjected to heat treatment at the stage of raw material processing and heated only once after forming a vegetable juice. Therefore, the vegetable juice prepared using the vegetable puree of the invention obtained by the above process satisfactorily retains flavor and taste, freshness, and nutritional elements of raw vegetables. Similarly, the vegetable juice prepared using the vegetable puree of the invention together with a squeezed juice or a puree of other vegetables and/or fruits (e.g., heated purees prepared by the conventional method) excels in flavor and taste, freshness and nutritional elements.

For example, a vegetable juice prepared using a cabbage puree as a vegetable puree of the invention together with a heated vegetable puree and/or squeezed juice has excellent flavor and taste, thus being preferable. When the unheated vegetable puree of the invention is mixed with a heated vegetable puree and/or squeezed juice, their mixing ratio may be suitably selected. The vegetable puree of the invention is usually used in a proportion of about 5 wt. % or more, based on the total weight of the vegetable puree(s) and/or squeezed juice.

The unheated green vegetable puree of the invention satisfactorily retains the original flavor and taste, freshness, and nutritional elements of vegetables and has the same level of quality as raw vegetables. Browning or like deterioration does not occur in the vegetable puree of the invention. The vegetable puree of the invention which has been stored in a frozen state for a long time also substantially maintains flavor and taste, freshness and nutritional elements, and browning or like deterioration does not occur. Therefore, by incorporating the vegetable puree of the present invention, a high-quality vegetable Juice maintaining the original flavor and taste, freshness, and nutrients of vegetables can be provided and has texture as if the vegetables per se were ingested.

BEST MODE FOR CARRYING OUT THE INVENTION

Examples and Comparative Examples are given below to describe the present invention in more detail.

EXAMPLE 1

After removal of damaged or brown portions, a cabbage was washed with a 0.2% solution of SUNNYSAFE (trade name: sucrose fatty acid ester) and fully rinsed with running water. The cabbage was cut in 1/16 with a kitchen knife and cut into 9.6 mm×9.6 mm cubes with a dicer and placed into a COMITROL (manufactured by Urschel Laboratories, Inc.: a head with 80 blades, MICROCUT HEAD 08156). At the same time, a concentrated lemon juice as diluted 4-fold with water in view of work efficiency was poured into the COMITROL in an amount of 1 wt. %, calculated as acidity (citric acid), based on the total weight of the vegetable puree.

After grinding using the COMITROL, the resulting mixture was stirred until the whole mixture had a constant pH and a constant acidity, thus giving a raw puree.

The puree was packed in a 18-liter can and the canned puree was stored in a freezing compartment at −20° C. or below to give a frozen puree.

EXAMPLE 2–4

A cabbage was placed in a COMITROL (manufactured by Urschel Laboratories, Inc.: a head with 80 blades) in the same manner as described in Example 1. At the same time, a concentrated lemon juice as diluted 4-fold with water in view of work efficiency was poured into the COMITROL in an amount of 1 wt. %, calculated as acidity (citric acid), based on the total weight of the vegetable puree obtained. Added together with the concentrated lemon juice was calcium gluconate (Example 2), sodium gluconate (Example 3), or potassium gluconate (Example 4), in an amount of 0.23 parts by weight per 100 parts by weight of the vegetable to be ground.

After grinding using the COMITROL, the same procedure as shown in Example 1 was followed to give a raw puree and a frozen puree.

EXAMPLE 5

A cabbage was placed in a COMITROL (manufactured by Urschel Laboratories, Inc.: a head with 80 blades) in the same manner as in Example 1, while a concentrated lemon juice as diluted 4-fold with water in view of work efficiency was poured into the COMITROL in an amount of 1 wt. %, calculated as acidity (citric acid), based on the total weight of the vegetable puree obtained. Added together with the concentrated lemon juice was sodium chloride in an amount of 0.23 parts by weight per 100 parts by weight of the vegetable to be ground.

After grinding using the COMITROL, the same procedure as shown in Example 1 was followed to give a raw puree and a frozen puree.

EXAMPLE 6

A cabbage was placed in a COMITROL (manufactured by Urschel Laboratories, Inc.: a head with 50 blades, MICROCUT HEAD 050156) in the same manner as in Example 1. At the same time, a concentrated lemon juice as diluted 4-fold with water in view of work efficiency was poured into the COMITROL in an amount of 0.85 wt. %, calculated as acidity (citric acid), based on the total weight of the vegetable puree obtained.

After grinding using the COMITROL, the same procedure as shown in Example 1 was followed to give a raw puree and a frozen puree.

EXAMPLE 7

A cabbage was placed in a COMITROL (manufactured by Urschel Laboratories, Inc.: a head with 80 blades) in the same manner as in Example 1. At the same time, a concentrated lemon juice as diluted 4-fold with water in view of work efficiency was poured into the COMITROL in an amount of 0.5 wt. %, calculated as acidity (citric acid), based on the total weight of the vegetable puree obtained.

After grinding using the COMITROL, the same procedure as shown in Example 1 was followed to give a raw puree and a frozen puree.

COMPARATIVE EXAMPLE 1

A cabbage was cut into 9.6 mm×9.6 mm cubes in the same manner as in Example 1 and blanched in boiling water (95° C.) for 2 minutes. The blanched cabbage was drained and placed in a COMITROL (manufactured by Urschel Laboratories, Inc.: a head with 80 blades). After grinding using the COMITROL, the resulting mixture was stirred until the whole mixture had a constant pH and a constant acidity, thus giving a puree.

COMPARATIVE EXAMPLE 2

A cabbage was ground using the COMITROL in the same manner as in Example 1 and squeezed with a decanter to give a cabbage squeezed juice. The squeezed juice was packed in a 18-liter can and frozen in the same manner as in Example 1.

Described below are evaluation methods.

First, the purees obtained in Examples 1–7 and Comparative Example 1, before being packed in 18-liter cans, were evaluated for Brix, acidity (citric acid) (g %), pH, insoluble solids content (v/v %), total plate count (cfu/g), *Escherichia coli* count, catalase reaction, vitamin C content (mg/100 ml) and flavor and taste. The squeezed juice obtained in Comparative Example 2 was only evaluated for flavor and taste.

Brix was measured using a refractometer (20° C.). A glass electrode pH meter was used to measure pH.

Acidity (citric acid) was determined by N/10NaOH titrimetry, insoluble solids content determined by the centrifugal method, and vitamin C content (mg/100 ml) determined by the indophenol method (all JAS methods).

Total plate count and *Escherichia coli* count were determined by the methods described in the Ministry of Health and Welfare Announcement No. 370, Standards for Foods, Frozen Foods 1.(3).

In the catalase reaction test, the result was evaluated as positive if addition of 3% aqueous hydrogen peroxide solution causes bubbling.

Flavor and taste were evaluated for flavor, taste and freshness of cabbage according to the following criteria:

Score 10: excellent (highly superior to the conventional product):

Score 5: average (the same level as the conventional product);

Score 1: not at all (extremely inferior to the conventional product).

The samples used for the evaluation of flavor and taste were cabbage purees or squeezed juice per se. Table 1 shows the results.

TABLE 1

|  | Example 1 | Example 2 | Example 3 | Example 4 | Example 5 | Example 6 | Example 7 | Comp. Ex. 1 | Comp. Ex. 2 |
|---|---|---|---|---|---|---|---|---|---|
| Brix | 6.63 | 6.71 | 6.71 | 6.71 | 6.71 | 7.04 | 6.53 | 5.00 |  |
| Acidity (citric acid) | 0.998 | 1.069 | 1.069 | 1.069 | 1.069 | 0.848 | 0.525 | 0.080 |  |
| pH | 3.52 | 3.47 | 3.47 | 3.47 | 3.47 | 3.64 | 4.09 | 6.33 |  |
| Insoluble solids content | 54 | 54 | 54 | 54 | 54 | 60 | 54 | 40 |  |
| Total plate count | 200 | 200 | 200 | 200 | 200 | 100 | 300 | 1000 |  |
| *Escherichia coli* | −* | −* | −* | −* | −* | −* | −* | −* |  |
| Vitamin C | 14 | 16 | 16 | 16 | 16 | 16 | 10 | 3 |  |
| Catalase reaction | −** | −** | −** | −** | −** | −** | −** | −** |  |
| Flavor and Taste (puree or squeezed juice) | 8.5 | 9 | 9 | 9 | 9 | 10 | 7 | 5 | 7*** |

In Table 1, *,  and * mean the following.
*: In the section of *Escherichia coli*, "−" means *Escherichia coli* negative (the same applied to the tables given below).
**: In the section of catalase reaction. "−" means catalase reaction negative (the same applied to the tables given below).
***: As regards the squeezed juice obtained in Comparative Example 2, only flavor and taste were evaluated (the same applied to the tables given below).

The purees obtained in Examples 1–6 had particularly excellent flavor and taste. These purees, after being frozen for 10 days and thawed, were tested for the same evaluation items as above. Similarly, the squeezed juice obtained in Comparative Example 2 was frozen for 10 days and thawed and evaluated for flavor and taste. The samples used for the evaluation of flavor and taste were thawed cabbage purees or a squeezed juice per se, and Juices each prepared by mixing 40 wt. % of the thawed cabbage puree or the squeezed juice, 10 wt. % of an apple juice (four-fold concentrate) and 50 wt. % of water, followed by heating for pasteurization at 97° C. for 5 seconds. In the above process, the purees and squeezed juice frozen for 10 days were thawed in about 10–20° C. water over a period of about 10–15 hours. Table 2 shows the result.

Juice as incorporated into a juice was heated for pasteurization during canning. Therefore, presumably, purees, not squeezed juices, are more suitable for use in food compositions such as juices which are heated for pasteurization during canning or like packing (Comparative Example 2).

In comparison of the product freshly prepared and the product stored in a frozen state for 10 days, there was not much change in physical property values. In the frozen state, the total plate count further decreased to the level meeting the standards for microorganisms in frozen foods to be eaten after heating, namely, "total plate count 3,000,000 cfu or less per gram" and "*Escherichia coli* negative".

Browning or like deterioration did not occur in the vegetable purees of the invention obtained in Examples 1–6, even after being stored in a frozen state for one year.

TABLE 2

|  | Example 1 | Example 2 | Example 3 | Example 4 | Example 5 | Example 6 | Comp. Ex. 2 |
|---|---|---|---|---|---|---|---|
| Brix | 6.52 | 6.52 | 6.52 | 6.52 | 6.52 | 6.91 |  |
| Acidity (citric acid) | 1.024 | 1.043 | 1.043 | 1.043 | 1.043 | 0.829 |  |
| pH | 3.49 | 3.50 | 3.50 | 3.50 | 3.50 | 3.66 |  |
| Insoluble solids content | 50 | 54 | 54 | 54 | 54 | 60 |  |
| Total plate count | 110 | 150 | 150 | 150 | 150 | 0 |  |
| *Escherichia coli* | −* | −* | −* | −* | −* | −* |  |
| Vitamin C | 13 | 15 | 15 | 15 | 15 | 15 |  |
| Catalase reaction | −** | −** | −** | −** | −** | −** |  |
| Flavor and Taste (puree or squeezed Juice) | 8 | 8.5 | 8.5 | 8.5 | 8.5 | 9.5 | 7*** |
| Flavor and Taste (juice) | 8 | 8.5 | 8.5 | 8.5 | 8.5 | 9.5 | 3*** |

As is evident from Table 1 and 2, the purees of the present invention obtained in Examples 1–7 achieved excellent results. When the acidity (citric acid) was 0.6 wt. % or more (pH 4 or less) (Examples 1–6), particularly excellent flavor and taste were provided.

By adding a salt and acids at the same time, the resulting vegetable purees had better flavor (Examples 2–5).

As a less number of blades were used for grinding, a fresher puree was obtained (Example 6).

According to the conventional manufacturing methods, vitamin C was partially lost upon heating in the blanching process (Comparative Example 1). By contrast, the residual amount of vitamin C in the puree of the present invention increased.

The squeezed juice per se had a fresh flavor and taste of cabbage but its flavor and taste were lost when the squeezed Similarly, in the juices prepared using the vegetable purees of Examples 1–6 and heated for pasteurization according to the Food Sanitation Law, browning or like degeneration did not occur even after a period of time corresponding to one year in the accelerated test.

The grain sizes of the purees obtained in Example 1 (COMITROL head with 80 Blades) and in Example 6 (COMITROL head with 50 blades) were measured. Table 3 shows the result.

The method of grain size measurement is shown below. 50 g of a raw ground puree sample is diluted 10-fold with water and passed through layers of tared sieves. During this process, water is poured over the sieves in sequence from a 12 mesh sieve so as to fully disperse the sample. After the sample is allowed to stand for 2 minutes, moisture remaining on the outside and in the bottom portions of the sieves is wiped off. The weight of the residue in each sieve is determined by measuring the total weight and subtracting the tare, and the grain size distribution is calculated.

TABLE 3

| Mesh | Sieve opening (mm) | Example 1 | Example 6 |
|---|---|---|---|
| 12 | 1.4 | 0.4 | 5.1 |
| 14 | 1.18 | 0.9 | 3.9 |
| 16 | 1 | 1.8 | 3.7 |
| 22 | 0.71 | 4 | 8.6 |
| 30 | 0.5 | 7.3 | 10.4 |
| | Total weight (g) | 14.4 | 31.7 |
| | Residual percentage****(%) | 28.8 | 63.4 |

$$****\text{Residual percentage (\%)} = \frac{\text{Total weight (g)}}{50 \text{ g (sample amount)}} \times 100$$

The purees obtained using a head with 80 blades or 50 blades had a grain size such that 25 wt. % or more of the purees were retained on 12 to 30 mesh sieves (JIS standard).

EXAMPLES 8–10

Other vegetables, namely, broccoli, celery and lettuce were evaluated in a similar manner as cabbage and shown as Examples 8–10. The puree production method, evaluation items and evaluating methods were all the same as in Example 1. Table 4 shows the results of raw purees before being packed in 18-liter cans. Table 5 shows the results of thawed purees stored in a frozen state for 10 days and thawed. The flavor and taste of juices each prepared using the thawed purees were also evaluated. More specifically, 40 wt. % of the thawed cabbage puree, 10 wt. % of an apple juice (4-fold concentrate) and 50 wt. % of water were mixed and heated for pasteurization at 97° C. to give a juice.

TABLE 4

| Evaluation item | Example 8 (broccoli) | Example 9 (celery) | Example 10 (lettuce) |
|---|---|---|---|
| Brix | 5.07 | 2.55 | 2.14 |
| Acidity (citric acid) | 0.998 | 0.998 | 0.998 |
| pH | 3.52 | 3.52 | 3.72 |
| Insoluble solids content | 51 | 22 | 31 |
| Total plate count | 100 | 5000 | 2500 |
| Escherichia coli | —* | —* | —* |
| Vitamin C | 53 | 6 | 6 |
| Catalase reaction | —** | —** | —** |
| Flavor and Taste (puree) | 8.5 | 8.5 | 8.5 |

TABLE 5

| Evaluation item | Example 8 (broccoli) | Example 9 (celery) | Example 10 (lettuce) |
|---|---|---|---|
| Brix | 5.00 | 2.55 | 2.10 |
| Acidity (citric acid) | 1.024 | 1.020 | 1.028 |
| pH | 3.49 | 3.50 | 3.50 |
| Insoluble solids content | 51 | 22 | 31 |
| Total plate count | 50 | 100 | 100 |
| Escherichia coli | —* | —* | —* |
| Vitamin C | 53 | 6 | 6 |
| Catalase reaction | —** | —** | —** |
| Flavor and Taste (puree) | 8 | 8 | 8 |

TABLE 5-continued

| Evaluation item | Example 8 (broccoli) | Example 9 (celery) | Example 10 (lettuce) |
|---|---|---|---|
| Flavor and Taste (juice) | 8 | 8 | 8 |

As is clear from Tables 4 and 5, the results of broccoli, celery and lettuce are similar to those of cabbage.

EXAMPLE 11 AND COMPARATIVE EXAMPLE 3

25 wt. % of the unheated cabbage puree obtained in Example 1, 8 wt. % of a heated broccoli puree and 50 wt. % of a mixed vegetable juice (jew's mallow, lettuce, spinach, parsley), 2 wt. % of concentrated lemon juice and 15 wt. % of water were mixed and heated for pasteurization at 97° C. for 5 seconds to give a juice (Example 11). A juice was prepared in the same manner as in Example 11 except that the heated cabbage puree obtained in Comparative Example 1 was used in place of the unheated cabbage puree obtained in Example 1 (Comparative Example 3). The flavor and taste of the Juices (n=9) obtained in Example 11 and in Comparative Example 3 were evaluated in the same manner as in Examples 1–10. Table 6 shows the results.

TABLE 6

| | Example 11 | Comp. Ex. 3 |
|---|---|---|
| Score (average) | 7.56***** | 6.34 |

*****The percentage risk is 5% or less; there is a significant difference.

Only the best mode and preferred embodiment of the invention has been presented in the above Examples, but it is to be understood that the invention is not limited thereto and thereby. The present invention further includes the following embodiments:

Item I. An unheated green vegetable puree which does not have catalase activity and contains an acid or acids and has a pH of 2.7–4.1.

Item I-i The vegetable puree according to item I, which is obtainable by a process comprising a grinding step and an acid addition step.

Item I-ii The vegetable puree according to item I-i, the puree being obtainable by the process wherein the acid addition is performed before or during the grinding step.

Item I-iii The vegetable puree according to item I-i, the puree being obtainable by the process wherein the acid addition is performed immediately after the grinding step.

Item I-iv The vegetable puree according to item I, the puree being obtainable by freezing a puree prepared by a process comprising a grinding step and an acid addition step.

Item I-v The vegetable puree according to item I-iv, the puree being obtainable by the process wherein the acid addition is performed before or during the grinding step.

Item I-vi The vegetable puree according to item I-iv, the puree being obtainable by the process wherein the acid addition is performed immediately after the grinding step.

Item I-vii The vegetable puree according to item I-i or I-iv, the puree being obtainable by the process wherein the acid is an organic acid or organic acids.

Item I-viii The vegetable puree according to item I-vii, the puree being obtainable by the process wherein the organic acid or organic acids are used in an amount of 0.6 to 1.3 wt. %, calculated as acidity (citric acid), based on the total weight of the vegetable puree obtained.

Item I-ix The vegetable puree according to item I-viii. the puree being obtainable by the process wherein the organic acid or organic acids are used in an amount of 0.8 to 1.1 wt. %, calculated as acidity (citric acid), based on the total weight of the vegetable puree obtained.

Item I-x The vegetable puree according to item I-i or I-iv, which is obtainable by a process comprising adding a salt or salts.

Item I-xi The vegetable puree according to item I-x, the puree being obtainable by the process wherein the salt or salts are one or more species selected from the group consisting of sodium chloride, calcium gluconate, sodium gluconate and potassium gluconate.

Item I-xii The vegetable puree according to item I-x, the puree being obtainable by the process wherein the salt or salts are used in an amount of 0.2 wt. parts or more per 100 wt. parts of the vegetables to be ground.

Item I-xiii The vegetable puree according to item I-xii, the puree being obtainable by the process wherein the salt or salts are used in an amount of 0.2 to 2 wt. parts per 100 wt. parts of the vegetables to be ground.

Item I-xiv The vegetable puree according to item I-l or I-iv, the puree being obtainable by a process comprising grinding vegetables using a COMITROL which as 100 or less blades on the head.

Item I-xv The vegetable puree according to item I-xiv, the puree being obtainable by the process comprising grinding vegetables using the COMITROL which has 50 to 100 blades on the head.

Item I-xvi The vegetable puree according to item I-xiv, the puree being obtainable by the process comprising grinding vegetables using the COMITROL which has 80 blades or less on the head.

Item I-xvii The vegetable puree according to item I-xvi, the puree being obtainable by the process comprising grinding vegetables using the COMITROL which has 50 to 80 blades on the head.

Item I-xviii The vegetable puree according to item I, which has a grain size such that 25 wt. % or more of the puree is retained on 12 to 30 mesh sieves (JIS standard).

Item I-xix The vegetable puree according to item I, which has a pH of 4.1 or less.

Item I-xx The vegetable puree according to item I, which has a pH of 2.7 to 3.7.

Item II A food containing the vegetable puree of item I.

Item III A composition according to item II wherein the food is a vegetable juice.

Item III-i The vegetable puree-containing beverage according to item III wherein the vegetable puree content is 5 wt. % or more, based on the total weight of the beverage.

Item III-ii The vegetable puree-containing beverage according to item III-i, wherein the vegetable puree content is 5 to 40 wt. %, based on the total weight of the beverage.

Item III-iii The vegetable puree-containing beverage according to item III-i wherein the vegetable puree content is 8 wt. % or more, based on the total weight of the beverage.

Item III-iv The vegetable puree-containing beverage according to item III-iii wherein the vegetable puree content is 8 to 40 wt. %, based on the total weight of the beverage.

Item IV A process for preparing an unheated green vegetable puree, which comprises a grinding step and an acid addition step.

Item IV-i The process according to item IV, wherein the acid addition is performed before or during the grinding step.

Item IV-ii The process according to item IV, wherein the acid addition is performed immediately after the grinding step.

Item IV-iii The process according to item IV, which further comprises freezing the ground puree.

Item IV-iv The process according to item IV, wherein the acid is an organic acid or organic acids.

Item IV-v The process according to item IV-iv, wherein the organic acid or organic acids are used in an amount of 0.6 to 1.3 wt. %, calculated as acidity (citric acid), based on the total weight of the vegetable puree obtained.

Item IV-vi The process according to item IV-v, wherein the organic acid or organic acids are used in an amount of 0.8 to 1.1 wt. %, calculated as acidity (citric acid), based on the total weight of the vegetable puree obtained.

Item IV-vii The process according to item IV, which comprises adding a salt or salts.

Item IV-viii The process according to item IV-vii, wherein the salt or salts are one or more species selected from the group consisting of sodium chloride, calcium gluconate, sodium gluconate and potassium gluconate.

Item IV-ix The process according to item IV-vii wherein the salt or salts are used in an amount of 0.2 wt. parts or more per 100 wt. parts of the vegetables to be ground.

Item IV-x The process according to item IV-ix, wherein the salt or salts are used in an amount of 0.2 to 2 wt. parts per 100 wt. parts of the vegetables to be ground.

Item IV-xi The process according to Item IV wherein the vegetables are ground using a COMITROL which has 100 or less blades on the head.

Item I-xii The process according to Item IV-xi wherein the vegetables are ground using the COMITROL which has 50 to 100 blades on the head.

Item IV-xiii The process according to item IV-xi, wherein the vegetables are ground using the COMITROL which has 80 or less blades on the head.

Item IV-xiv The process according to Item IV-xiii wherein the vegetables are ground using the COMITROL which has 50 to 80 blades on the head.

What is claimed is:

1. A vegetable juice comprising an unheated cabbage puree which does not have catalase activity, comprising at least one acid and having a pH of about 3 to about 3.7.

2. The vegetable juice according to claim 1, wherein the puree is obtainable by a process comprising a grinding step and an acid addition step.

3. The vegetable juice according to claim 2, the puree being obtainable by the process wherein the acid addition is performed before or during the grinding step.

4. The vegetable juice according to claim 2, the puree being obtainable by the process wherein the acid addition is performed immediately after the grinding step.

5. The vegetable juice according to claim 2, further comprising a salt water washing step.

6. The vegetable juice according to claim 1, the puree being obtainable by freezing the puree prepared by a process comprising a grinding step and an acid addition step.

7. The vegetable juice according to claim 6, the puree being obtainable by the process wherein the acid addition is performed before or during the grinding step.

8. The vegetable juice according to claim 6, the puree being obtainable by a process wherein the acid addition is performed immediately after the grinding step.

9. The vegetable juice according to claim 1, wherein the puree has a grain size such that 25 wt. % or more of the puree is retained on 12 to 30 mesh sieves (JIS standard).

10. The vegetable juice according to claim 1, wherein the acid is an organic acid.

11. The vegetable juice according to claim 10, wherein the organic acid is an acid selected from the group consisting of citric acid, acetic acid, succinic acid, malic acid, and ascorbic acid.

12. The vegetable juice according to claim 1, further comprising at least one salt.

13. The vegetable juice according to claim 12, wherein the salt is a compound selected from the group consisting of sodium chloride, calcium gluconate, sodium gluconate, and potassium gluconate.

14. A process for preparing a vegetable juice comprising an unheated cabbage puree, the method comprising grinding the cabbage;

adding an acid to the cabbage, thereby producing the puree;

adding the puree to a liquid, thereby producing the vegetable juice.

15. The process according to claim 14 wherein the acid addition is performed before or during the grinding step.

16. The process according to claim 14 wherein the acid addition is performed immediately after the grinding step.

17. The process according to claim 14 which further comprises freezing the ground puree.

18. The process according to claim 14 wherein the vegetables are ground using a cutter mill which has 100 or less blades on the head.

19. The process according to claim 14 wherein the cabbage puree has a pH of about 3 to about 3.7.

* * * * *

UNITED STATES PATENT AND TRADEMARK OFFICE
CERTIFICATE OF CORRECTION

PATENT NO. : 6,833,148 B1
DATED : December 21, 2004
INVENTOR(S) : Keiko Yamamoto et al.

It is certified that error appears in the above-identified patent and that said Letters Patent is hereby corrected as shown below:

Title page,
Item [75], Inventors, delete "Minoo" and insert therefor -- Osaka --.

Signed and Sealed this

Fourth Day of October, 2005

JON W. DUDAS
*Director of the United States Patent and Trademark Office*